July 21 1925.
J. H. PLOEHN
METAL WHEEL
Filed May 26, 1922
1,546,793
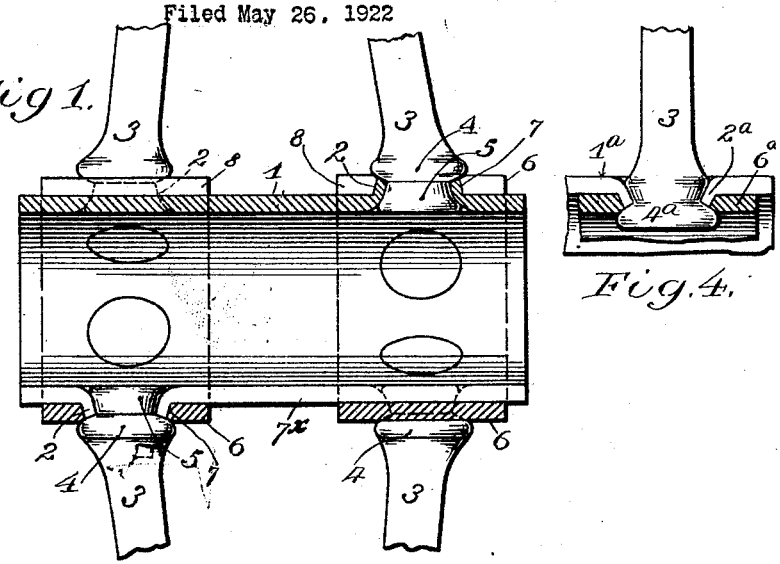
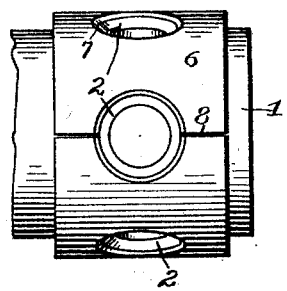
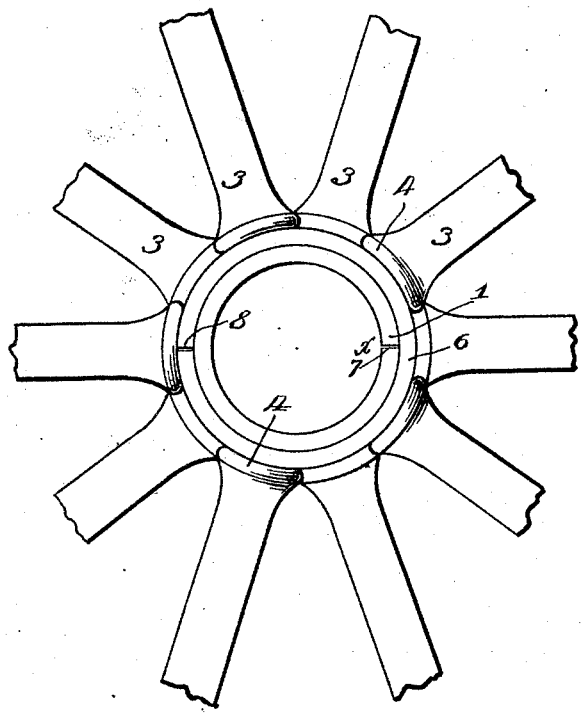
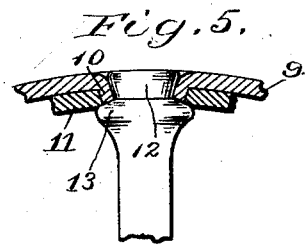
Inventor
J. H. Ploehn
by Rogers, Kennedy & Campbell
Att'ys Patented July 21, 1925.

1,546,793

UNITED STATES PATENT OFFICE.

JOHN H. PLOEHN, OF DAVENPORT, IOWA, ASSIGNOR TO G. WATSON FRENCH, JOSEPH L. HECHT, AND W. H. STACKHOUSE, COMPOSING THE FIRM OF FRENCH AND HECHT, OF DAVENPORT, IOWA.

METAL WHEEL.

Application filed May 26, 1922. Serial No. 563,790.

*To all whom it may concern:*

Be it known that I, JOHN H. PLOEHN, a citizen of the United States, residing at Davenport, in the county of Scott and State of Iowa, have invented certain new and useful Improvements in Metal Wheels, of which the following is a specification, reference being had therein to the accompanying drawing.

This invention relates to means for connecting parts or members fixedly together, and has reference more particularly to the connection of the members or parts of metal wheels, that is, the connection of the spokes to the hub or to the tire or to both.

The aim of the invention as applied to metal wheels is to so connect the spokes that the parts of the wheel will be joined with great strength and rigidity and without danger of disconnection, displacement, or looseness, and with this and other objects in view the invention consists in providing one of the members of the wheel, either the hub or the tire, with projecting hollow bosses to receive the spokes, and in applying to said member, a reenforcing member to surround and embrace the bosses; whereby the bosses will be prevented from spreading in the event of the spokes being subjected to endwise tension or pressure.

In the accompanying drawings:

Fig. 1 is a longitudinal sectional elevation of a wheel hub and connected spokes, having my invention embodied therein.

Fig. 2 is an end elevation of the same.

Fig. 3 is a side elevation of a portion of the hub and the boss reenforcing member applied thereto, the spokes being omitted.

Fig. 4 is a sectional elevation of a portion of a hub and a connected spoke, showing the invention in modified form.

Fig. 5 is a transverse section of a portion of a wheel tire and a connected spoke, with the latter is elevation, to show how the invention may be employed in the connection of the tire to the outer end of the spokes.

Referring to the drawings:

In Figs. 1 and 2, 1 designates a hub shell which is provided at intervals therearound with hollow spoke receiving bosses 2 projecting radially therefrom. These bosses may be formed in any appropriate manner, but I prefer to form them by punching or throwing the metal outwardly so as to produce tubular projections formed integrally with the hub shell and having preferably tapered bores. Secured within the bosses are spokes 3, each provided near its inner end with an annular shoulder 4 which seats against the outer end of the boss, and on its inner end with a tapered head or enlargement 5 which seats in and fills the bore of the boss, whereby the spokes will be firmly fixed to the hub shell within the bosses, and due to the tapered portion of the spokes fitting in the tapered bore of the boss, the spokes will be prevented from moving endwise in one direction in the boss. In order to prevent the boss from being spread laterally in the event of the spoke being subjected to endwise tension tending to force the head 5 through the boss, I provide a reenforcing member for the bosses, which in the present instance is in the form of a sleeve 6 surrounding the hub at its end and formed with openings 7 which receive and tightly surround the respective bosses, and thus serve to maintain their tubular form closely surrounding and embracing the spoke heads.

In the assembled relation of the parts as shown in Figs. 1 and 2, the annular shoulders 4 on the spokes bear against the portions of the reenforcing sleeve adjacent the holes surrounding the bosses, and with the heads on the spokes seated in the bosses, and the said shoulders bearing against the ends of the bosses, the spokes serve to maintain the hub shell and reenforcing sleeve firmly in fixed relations, while the sleeve surrounding the bosses prevents the same from spreading laterally.

The hub shell may be formed as a section of tubing, or it may be rolled or bent into tubular form from a flat sheet or plate. In the latter event, with the meeting edges of the bent plate disconnected and abutting, the shell will have a longitudinal slit 7ˣ, therein from end to end. In such case, the boss-reenforcing sleeve surrounding the hub may be of similar form; and in assembling the parts, the slit 8 in the sleeve will be disposed out of line with that in the shell as shown in Fig. 2. With the spokes seated in the bosses as shown and with the shoulders on the spokes bearing against the outer ends of the bosses and against the adjacent portions of the reenforcing sleeve, the split hub shell and split sleeve will be maintained permanently in cylindrical form and a solid and rigid hub structure will result. If desired, the meeting edges of the split hub shell may be welded together, as well as the edges of the sleeve, or the two may be spot welded at intervals to preserve their tubular form.

It is not necessary in realizing the benefits and advantages of the invention that the spoke receiving bosses extend outwardly from the hub shell as shown in Figs. 1 and 2, for substantially the same advantages may be secured if the bosses are projected inwardly of the hub shell 1ª as shown in Fig. 4. In this instance however, the reenforcing sleeve 6ª will extend circumferentially of the hub on the interior of the same to receive the inwardly projecting bosses 2ª, and the shoulder 4ª bearing against the end of the boss and the adjacent surrounding portion of the reenforcing member, will be on the inner end of the spoke, while the enlargement on the spoke seating in the boss will be adjacent the inner end of the spoke. In this case any tendency of the inward thrust on the spoke to rupture or spread the boss by expanding the same laterally, will be resisted and prevented by the reenforcing sleeve in a manner similar to the functioning of the sleeve in the first case described.

In Fig. 5 the invention is shown as applied to the connection of the outer end of the spokes with the wheel tire 9. In this case bosses 10 project from the tire inwardly, and a reenforcing sleeve 11 is applied to the inner side of the tire and has holes receiving the inwardly projecting bosses. The outer end of the spoke is formed with a terminal head 12 seated in the boss, and adjacent this head is an annular shoulder 13 bearing against the end of the boss and against the surrounding portion of the reenforcing sleeve, similar to the disposition and relation of the parts as shown and described in connection with Fig. 1.

While in Fig. 1 the hub is shown as having connected with it two rows or ranks of spokes, it will be understood that the invention is applicable as well where only a single row of spokes is employed.

In the foregoing description and accompanying drawings I have set forth my invention in the particular detailed form and construction of the parts which I prefer to adopt for it will be manifest that these details may be variously changed and modified without departing from the spirit of the invention; and further it will be understood that the invention is not limited to any particular form or construction of the parts except in so far as such limitations are specified in the claims.

Having thus described my invention, what I claim is:

1. In combination with a member provided with an opening through it surrounded by a projecting boss, a second member extending through said opening and embraced by the boss, and a reenforcing member independent of said second member and surrounding and embracing the boss and serving to prevent the lateral spread of the same.

2. In a wheel, the combination of a member thereof provided with hollow spoke receiving bosses, spokes extending within said bosses respectively and embraced thereby, and a sleeve extending circumferentially of said member and formed with openings, surrounding and embracing the bosses to prevent lateral spread of the same.

3. In combination with a wheel hub provided with a series of hollow outwardly projecting spoke receiving bosses, spokes extending within the respective bosses and firmly embraced thereby, and a sleeve surrounding the hub and formed with openings surrounding the respective bosses to prevent the lateral spread of the same.

4. In combination with a hub shell split longitudinally from end to end and provided with a series of hollow spoke receiving bosses, a split sleeve surrounding the hub shell and formed with a series of openings respectively surrounding the bosses to prevent the lateral spread, and spokes formed with enlargements filling the respective bosses and provided with shoulders bearing against the ends of the bosses and the sleeve and acting to secure the hub shell and sleeve in fixed relations.

5. In combination with a hub shell split longitudinally from end to end and provided with a series of outwardly projecting hollow spoke receiving bosses, a split sleeve surrounding the hub shell and formed with openings respectively surrounding and embracing the said bosses, and spokes formed on their ends with heads filling the bosses, and formed adjacent to said heads with shoulders bearing against the ends of the bosses and against the sleeve.

6. In combination with a member provided with a hollow projecting boss, a reenforcing element surrounding and embracing the same to prevent its lateral spread, and a second member extending within the boss and firmly embraced thereby, said second member being provided with a portion bearing against the reenforcing element.

In testimony whereof, I have affixed my signature hereto.

JOHN H. PLOEHN.